W. N. PARK.
FASTENER FOR DEMOUNTABLE RIMS.
APPLICATION FILED MAR. 29, 1918.
1,294,529.
Patented Feb. 18, 1919.
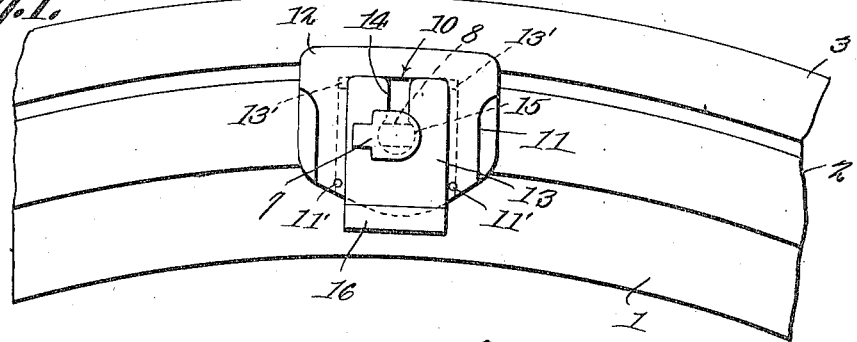
Inventor
W. N. Park

UNITED STATES PATENT OFFICE.

WILLIAM N. PARK, OF CORNING, NEW YORK.

FASTENER FOR DEMOUNTABLE RIMS.

1,294,529.  Specification of Letters Patent.  Patented Feb. 18, 1919.

Application filed March 29, 1918. Serial No. 225,486.

*To all whom it may concern:*

Be it known that I, WILLIAM N. PARK, a citizen of the United States, residing at Corning, in the county of Steuben and State of New York, have invented a new and useful Fastener for Demountable Rims, of which the following is a specification.

The subject of the present invention is a fastening device intended, primarily, for securing a demountable rim in place upon a wheel.

The main object of the invention is the provision of a fastener which may be quickly placed in position and removed.

A still further object of the invention is the provision of means for locking the fastener in place.

The invention also contemplates the provision of a fastener which will lock the rim against play longitudinally of the wheel.

The invention likewise contemplates generally improving the structure and enhancing the utility of fasteners.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

A practical embodiment of the invention is shown in the accompanying drawing, wherein:—

Figure 1 is a view in elevation of the device shown applied to a wheel;

Fig. 2 is a view in elevation viewed from the opposite direction to that of Fig. 1;

Fig. 3 is a transverse section taken centrally of the fastener;

Fig. 4 is a perspective view of the wedge plate;

Fig. 5 is a perspective view of the locking wedge;

Fig. 6 is a perspective view of the key;

Fig. 7 is a perspective view of a tool adapted for operating the fastener.

Referring to the drawing by numerals of reference:—

The usual wheel felly is indicated by the numeral 1, and seated upon the felly is the fixed rim 2 upon which is the usual demountable rim 3.

Secured to the inner side of the felly, and spaced at suitable intervals therealong, are the plates 4, only one of which is shown, which may be attached or locked to the felly by a screw 5. The plate 4 is apertured and threaded to receive the threaded end of a key 6 which extends through a bore drilled transversely of the felly. The key 6 is provided at its outer end with a formed head 7, between which and the body of the key is an attenuated or flattened neck 8.

The head 7 of the key is formed to pass through a key-hole slot 9 provided at the bottom of a groove 10 which extends transversely of the outer face of the apron 11 of the wedge plate 12.

A locking or clamping wedge 13 is adapted to slide in the groove 10, and the outer end of this wedge is bifurcated or slotted as at 14, the slot terminating in the enlarged portion 15. As will be apparent, when the key 6 is turned or rotated through ninety degrees from the position shown in Figs. 1 and 3, the flattened neck 8 will enter the slot 14 and allow the locking wedge to be slid into the groove 10. When the locking wedge is driven home in the groove 10 the neck of the key enters the enlarged portion 15 of the slot and the key may be turned so that the wedge is retained firmly in place in the groove.

In order that the locking wedge 13 and the wedge plate may be retained in assembled position and so avoid separation and loss of the parts when removed from the wheel, lugs 13' may be provided on the locking wedge 13, from which they extend laterally, for the purpose of contacting pins 11' which are secured in the apron 11 of the wedge plate 12. This will keep the wedge 13 from being completely withdrawn from the groove 10. While a specific means of securing these parts together is thus shown and described, it is to be understood that this object may be attained in any convenient manner.

The locking wedge 13 is shown as provided with an outturned inner end 16 whereby the wedge may be more readily and easily driven home in the groove or withdrawn therefrom.

The head 7 of the key may have a bore 17 drilled therein for the reception of an instrument, such as the reduced end 18 of a tool, whereby the key may be turned. The tool shown herein has a yoke 19 carried by the handle the inturned ends of which are adapted to engage under the sides of the apron of the wedge block or plate 12 for the purpose of removing the plate from beneath the rim 3.

Having thus described the invention, what is claimed as new and sought by Letters Patent, is:—

1. The combination with a wheel, a demountable rim thereon, and means for limiting the inward movement of the rim upon the wheel, of a plurality of rim clamping devices each comprising a key rotatable in the wheel felly and having a formed head projecting forwardly from the front face of the wheel felly, a wedge for insertion beneath the rim, an apron extending from the wedge and having a keyhole slot for the reception of the key, and a wedge plate slotted to straddle the key and insertible between the formed head of the key and the apron to lock the parts together.

2. The combination with a wheel, a demountable rim thereon, and means for limiting the inward movement of the rim upon the wheel, of a plurality of rim clamping devices each comprising a key rotatable in the wheel felly and having a formed head projecting forwardly from the front face of the wheel felly, a wedge for insertion beneath the rim, an apron extending from the wedge and having a keyhole slot for the reception of the key and a groove, and a wedge plate slotted to straddle the key and slidably mounted in the groove to engage the formed head of the pin and lock the parts together.

3. A rim fastener, including a pin, a plate threaded on one end of the pin, a formed head at the other end of the pin, a wedge, an apron integral with the wedge and having a keyhole slot and a groove, a wedge plate slidable in the groove and slotted to straddle the pin between the head of the pin and the apron, and means for retaining the wedge plate in the groove.

In testimony that I claim the foregoing as my own, I have hereto affixed my signature in the presence of two witnesses.

WILLIAM N. PARK.

Witnesses:
  Mrs. L. T. COLBY,
  CORNELIA H. RIKER.